United States Patent [19]
Martone

[11] 3,745,359

[45] July 10, 1973

[54] SCINTILLATION CRYSTAL WITH REFLECTION INHIBITING MATERIAL AND SCINTILLATION DEVICE EMBODYING THE CRYSTAL

[75] Inventor: Ronald J. Martone, Cheshire, Conn.

[73] Assignee: Picker Corporation, Cleveland, Ohio

[22] Filed: Mar. 22, 1971

[21] Appl. No.: 126,915

Related U.S. Application Data

[63] Continuation of Ser. No. 739,837, June 25, 1968, abandoned.

[52] U.S. Cl. .................................................. 250/369
[51] Int. Cl. .......................................... G01t 1/20
[58] Field of Search ................ 250/71.5 S, 71.5 R., 250/105, 80

[56] References Cited
UNITED STATES PATENTS
3,048,698  8/1962  Carlson ........................ 250/71.5 R

OTHER PUBLICATIONS

Bender et al., Nucleonics, pp. 52–56, Vol. 21, No. 10, Oct. 1963

Anger, Nucleonics, pp. 56–59, Vol. 21, No. 10, Oct. 1963

Primary Examiner—James W. Lawrence
Assistant Examiner—Davis L. Willis
Attorney—Watts, Hoffmann, Fisher & Heinke

[57] ABSTRACT

A scintillation camera includes an input phosphor, for producing scintillations in response to gamma rays and like radiation, in the form of a sheet of photofluorescent material having a wedge-shaped peripheral surface coated with a substantially non-reflective material to reduce the amount of light reflected from the peripheral surface.

19 Claims, 3 Drawing Figures

Patented July 10, 1973

3,745,359

INVENTOR.
RONALD J. MARTONE

BY *Watts, Hoffmann,
Fisher & Heinke*

ATTORNEYS

SCINTILLATION CRYSTAL WITH REFLECTION INHIBITING MATERIAL AND SCINTILLATION DEVICE EMBODYING THE CRYSTAL

This is a continuation of Ser. No. 739,837, filed June 25, 1968, now abandoned.

BACKGROUND OF THE INVENTION

Field of the invention

The present invention relates to radiation detection and more particularly to a scintillation camera equipped with a novel amd improved input phosphor construction.

In certain medical studies where gamma radiation is utilized, a quantity of radioactive isotope is administered to the patient. A scintillation detector and associated apparatus is positioned to detect and temporarily display and/or permanently record information about the radiation emitted from the patient.

Tumor diagnosis is an example of a medical study in which a quantity of a radioactive isotope is administered to the patient. Tumor diagnosis with isotopes is possible because tumorous tissue has an affinity for such isotopes which differs from the affinity of surrounding healthy tissue. After the isotope has been absorbed in the patient, a sutdy is made of the distribution and concentration of the isotope. A photograph or other graphic replica displaying the spatial distribution of the administered isotope in the patient provides diagnostic information as to the size and location of the tumor.

Description of the prior art

One known scintillation camera for use in medical diagnosis such as the tumor diagnosis discussed above has an array of phototubes facing a scintillator. The scintillator is positioned near the patient and in the path of gamma radiation from an administered radioactive isotope. The scintillator emits light flashes in response to impinging gamma radiation. The phototubes are spaced a short distance from the scintillator to survey overlapping areas thereof. Each scintillation from the scintillator is detected by one or more of the phototubes. Signals emitted from the phototubes are fed to a computing circuit which, by sensing the relative strength of emitted signals, computes the spatial location of each of the scintillations.

A scintillator used in this apparatus consists of a thin disc of a scintillation material such as a thallium-activated sodium iodide crystal. The crystal is formed with a cylindrical peripheral surface. When scintillations are produced in the crystal in response to radiation stimuli, light is emitted in various directions. A portion of the light travels through the disc toward its peripheral surface and is reflected back from the surface into the main portion of the disc. This light reflecting off the peripheral surface of the disc causes display non-linearities and introduces other errors into the final visual reproduction of the organ under study. It can be seen that this reflected light produces light signals at locations which are spatially displaced from the places of entry into the crystal of the impinging gamma radiation which originally produced these displaced signals. The phototubes detect these displaced reflected light images producing false information as to the spatial distribution of radiation emitted from the administered isotope.

SUMMARY OF THE INVENTION

The present invention overcomes the above-mentioned and other problems of the prior art. It comprises a scintillation camera with an input phosphor or scintillator in which the reflection of light from the peripheral surfaces as described is reduced substantially. To accomplish this, a preferred scintillator is in the form of a thin sheet or disc composed of a sodium iodide crystal. Since sodium iodide is hydroscopic, the input face of the disc is covered by an aluminum plate and the output face is bonded to a glass plate. The plates are in turn bonded to a surrounding mounting ring to provide a hermetic seal around the disc.

A peripheral portion of the disc includes at least one surface formed in a plane oblique to the planes of the input and output faces. The peripheral portion surface is coated with a material which reduces reflection. This is preferably a coating of black non-reflective material. The orientation of the oblique peripheral surface inhibits reflections back into the main portion of the disc. The non-reflective material increases absorption of light at the peripheral surface.

In one form of the invention, the scintillator disc has a wedge-shaped peripheral portion bounded by an annular peripheral surface oblique to and extending between the input and output faces. The wedge-shaped portion is defined by this oblique surface and another which is either a peripheral portion of the output or the input face of the disc. These two annular peripheral surfaces defining the wedge-shaped peripheral portion are coated with non-reflective material.

In a second form of the invention, the wedge-shaped peripheral portion is bounded by two annular, peripheral, oblique surfaces. These two peripheral surfaces bounding the wedge-shaped peripheral portion have a juncture intermediate the input and output faces and are coated with non-reflective material.

When any form of the invention is in use, light flashes are produced in a central or main portion of the disc at locations corresponding to the spatial distribution of the inpinging radiation. The light output from such central portion of the improved disc more accurately represents the spatial distribution of the gamma radiation than did prior devices. This improved accuracy is obtained because most of the light travelling from the main portion of the disc toward the wedge-shaped peripheral portion is trapped between the surfaces of this latter portion and ultimately absorbed by the non-reflective material. The light emitted toward the annular peripheral surfaces of the disc is subjected to one or more sequences of absorption and reflection, and light returned to the main portion is reduced substantially. The ultimate result is a display having improved linearity characteristics and a reduced number of error-producing signals.

Accordingly, the present invention has for its general object the provision of a novel and improved scintillation phosphor for a scintillation camera.

Other objects and advantages and a fuller understanding of the invention will be realized from the following detailed description and claims taken in conjunction with the drawings.

DESCRIPTION OF THE PREFERRED EMBODIMENTS

Figure 1:
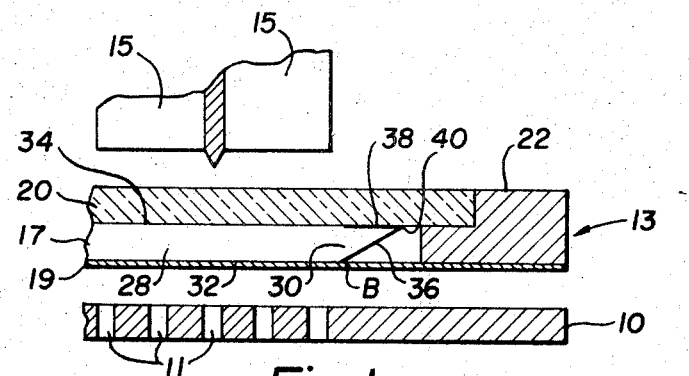
FIG. 1 is a fragmented, vertical sectional view of a portion of a scintillation camera showing a collimator, scintillator, and phototubes; and, FIGS. 2 and 3 are similar views showing alternative scintillators.

Referring to FIG. 1, various components of a scintillation camera are shown. A lead collimator 10 is provided with a plurality of collimating apertures 11. The collimator 10 is interposed between a source of radiation, not shown, and the input side of a scintillator assembly 13. The collimator 10 permits the passage of radiation travelling substantially parallel to axes of the apertures 11 and thereby inhibits the passage of radiation travelling in random directions which would distort the final visual reproduction of an object under study. An array of light responsive phototubes 15 are positioned on an output side of the assembly 13.

The scintillator assembly 13 includes a scintillator 17 interposed between a circular aluminum plate 19 on its input side and a circular transparent glass plate 20 on its output side. The scintillator 17 is bonded to the glass plate 20. The plates 19, 20 are each mounted on a surrounding annular metal ring 22. The plates 19, 20 and the ring 22 form a hermetically sealed chamber for the scintillator 17.

The scintillator 17 is a sheet of photofluorescent material, preferably in the form of a thin circular disc composed of a sodium iodide crystal. The scintillator 17 includes a central or main portion 28 and a wedge-shaped, peripheral, light absorber portion 30 about the main portion 28. The scintillator 17 also includes an input surface 32 adjacent the aluminum plate 19 and a parallel output surface 34 adjacent the glass plate 20. For example, dimensions of the disc may be on the order of 13½ inches in diameter and ½ inch thick.

Each time a scintillation appears in the scintillator 17, it is viewed by a plurality of the phototubes 15. The magnitude of the output signals produced by each phototube 15 depends on the distance from and the intensity of respective scintillations viewed. The resulting impulses from the phototubes 15 are passed through a computer (not shown) which determines the spatial location of each scintillation according to the relative strengths of the plurality of electrical pulses from the phototubes 15. An output signal from the computer is fed to a viewer such as an oscilloscope which presents a graphic display representing the spatial distribution of radioactive material under study.

The light absorber 30 of the scintillator 10 has an annular peripheral surface 36 oriented oblique to and extending between the input and output surfaces 32, 34. An annular, peripheral part 38 of the output surface 34 meets the peripheral surface 36 at a juncture 40 so that the light absorber 30 is in the form of a wedge defined by the peripheral surface 36 and the peripheral part 38. In this form of the invention, it can be seen that the juncture 40 is co-planar with the output surface 34.

The surface 36 and part 36, 38 are coated with non-reflective material B which, for example, may be a thin coating of lampblack. Other forms of light absorbing material and reflection-inhibiting devices are contemplated, such as a material having an appropriate index of refraction in relation to the index of refraction of the scintillator material used so that a substantial percentage of light proceeding toward the peripheral surface of the scintillator is bled off or absorbed by the material.

The magnitude of the angle formed between the peripheral surface 36 and the peripheral part 38 is not critical, at least with a sodium iodide crystal, but should be determined by a compromise between light trapping efficiency of the wedge and the useful display-producing area of the scintillator 17. For example, it may be preferred to make the angle between the surface 36 and part 38 slightly less than 45° and coat the output face peripheral part 38 at least one-half inch inward from the juncture 40 so that a substantial amount of light travelling generally parallel to the input and output surfaces 32, 34 and impinging on the peripheral surface 36 will undergo at least two reflections at surface 36 and part 38.

With the arrangement shown in FIG. 1, and using a wedge angle slightly less than 45°, it can be seen that at least for light rays travelling somewhat parallel to the input and output surfaces 32, 34 from the main portion 28 toward the light absorber 30, the light rays will either make first contact with the peripheral surface 36 or the peripheral part 38 and will subsequently be partially absorbed by the black material B and partially reflected toward the other of the surface 36 and part 38. After one or more reflections and/or absorptions of this light impinging on the surface 36 and part 38, light which might otherwise be reflected off the peripheral surfaces and returned toward the main portion 28 of the scintillator or phototubes 15 is dissipated to a negligible level.

Figure 2:
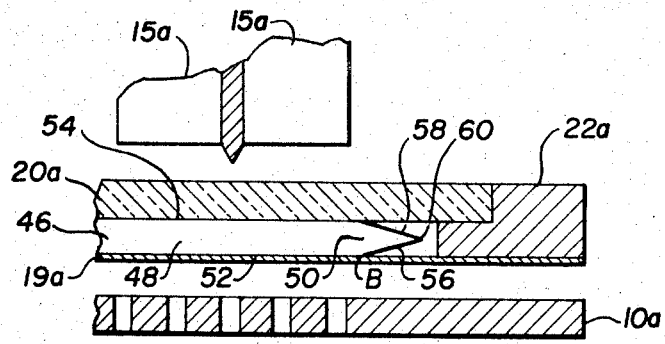

In a second form of the invention shown in FIG. 2, collimator 10a, phototubes 15a, plates 19a, 20a, and ring 22a are the same as the corresponding elements of FIG. 1. In this second form, a scintillator 46 has a central portion 48 and a modified wedge-shaped light absorber portion 50. Parallel input and output surfaces 52, 54 of the scintillator 46 are bonded to the plates 19a, 20a respectively. The light absorber 50 is defined by oblique, annular, peripheral surfaces 56, 58. The surfaces 56, 58 intersect one another at a juncture 60. The surfaces 56, 58 intersect at an acute angle to form a wedge. The peripheral surfaces 56, 58 are coated with lampblack B or other light absorbing material.

As shown, the juncture 60 of the peripheral surfaces 56, 58 is spaced from the plates 19a, 20a and is intermediate the planes of the input and output surfaces 52, 54. It is again preferable to make the angle between the peripheral surfaces 42, 44 less than 45° to increase the possibilities of multiple reflections and absorptions of light travelling from the main portion 48 into the light absorber 50.

Figure 3:
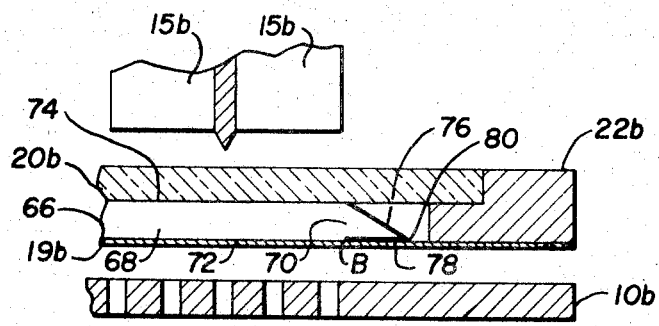

In the structure shown in FIG. 3, collimator 10b, phototubes 15b glass plates 19b, 20b, and metal ring 22b are the same as corresponding elements in FIG. 1. The orientation of the wedge-shaped light absorber portion is reversed from the position shown in FIG. 1. In this form, a scintillator 66 has a main portion 68 and a surrounding wedge-shaped light absorber portion 70. The scintillator 66 also includes parallel input and output surfaces 72, 74. The light absorber 70 has a peripheral surface 76 oblique to and extending between the input and output surfaces 72, 74. A peripheral part 78 of the input surface 72 forms a part of the light absorber 70. The surface 76 and part 78 form an acute angle with one another and meet at a juncture 80 spaced from the glass plate 20b and co-planar with the input face 72. The surface 76 and part 78 forming the wedge are coated with lampblack B.

It is contemplated that the present invention has applications in a variety of radiation image devices and is not limited to the collimator and phototube arrangement shown.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:

1. In a radiation image device, a scintillation phosphor comprising:
   a. a sheet of photofluorescent material including an input face and an output face, the sheet also including a main portion and wedge-shaped circumferential peripheral portion between said input and output faces;
   b. said peripheral portion including peripheral faces meeting at a juncture; and,
   c. reflection inhibiting material substantially covering said peripheral faces.

2. The assembly of claim 1 wherein the juncture is co-planar with said output face.

3. The assembly of claim 1 wherein the juncture is intermediate planes of said input and output faces.

4. The assembly of claim 1 wherein the juncture is co-planar with said input face.

5. A scintillation camera comprising:
   a. radiation delineating means;
   b. a scintillator for producing a light output in response to radiation stimuli;
   c. light responsive means to receive the spatial light scintillations from said scintillator and to produce an output representative of the spatial light scintillations emitted by said scintillator and received by said light responsive means;
   d. said scintillator being positioned between said radiation delineating means and said light responsive means;
   e. said scintillator having a peripheral light absorbent region for absorbing at least a portion of the scintillator light transmitted into the peripheral region and for inhibiting the reflection of light from the periphery of the scintillator back into the main imaging portion of the scintillator; and,
   f. said light absorbent region including a wedge-shaped peripheral surface portion formed integrally with said scintillator.

6. The scintillation camera of claim 5 wherein said light absorbent region further includes a layer of light absorbing material in contact with said peripheral surface.

7. The scintillation camera of claim 6 wherein said layer of light absorbing material is adhered to said peripheral surface.

8. The scintillation camera of claim 7 wherein said light absorbing material comprises a black coating.

9. A scintillation camera comprising:
   a. a housing;
   b. a collimator connected to said housing;
   c. a scintillation crystal assembly including a disc-like crystal carried by said housing near said collimator;
   d. an array of phototubes positioned in said housing to receive light from said crystal and to emit electric signals in response to light received from said crystal when a scintillation occurs in said crystal;
   e. said assembly being interposed between said collimator and said array of phototubes;
   f. said crystal including a main imaging portion, a circumferential peripheral portion around said main imaging portion, an input face and an output face;
   g. said peripheral portion including a peripheral surface joining said input and output faces;
   h. said peripheral surface including at least two surfaces, at least one of which is oblique to said input and output faces; and
   i. said assembly further including a light absorbing means disposed around said crystal and contiguous with said peripheral surface.

10. The scintillation camera of claim 9 wherein said light absorbing means includes a layer of light absorbing material adhered to said peripheral surface.

11. The scintillation camera of claim 10 wherein said light absorbing material comprises a black coating.

12. The scintillation camera of claim 9 wherein said peripheral portion is wedge-shaped.

13. In a scintillation camera of the type having a radiation delineating means, a light responsive means for receiving spatial light scintillations and for producing an output signal representative of the spatial light scintillations received, and a scintillation means interposed between the radiation delineating means and the light responsive means for producing spatial light scintillations in response to radiation stimuli, the improvement of a scintillation means comprising:
   a. a substantially planar scintillation crystal having an input face, an output face and a peripheral surface connecting said input face and said output face;
   b. light absorbent means disposed around the periphery of the crystal and contiguous with the peripheral surface for absorbing at least a portion of the scintillator light in the peripheral region of the crystal and for inhibiting the reflection of light from the periphery of the crystal into the main imaging portion of the crystal.

14. The scintillation camera of claim 13 wherein said light absorbent means comprises a layer of light absorbent material adhered to the peripheral surface of the crystal.

15. The scintillation camera of claim 14 wherein the layer of light absorbent material comprises a coating which is deposited on the peripheral surface.

16. The scintillation camera of claim 13 wherein the peripheral surface includes at least first and second surfaces, at least one of which is oblique to the input and output faces of the crystal.

17. The scintillation camera of claim 16 wherein said light absorbent means includes a layer of light absorbent material adhered to at least one of said first and second surfaces.

18. The scintillation camera of claim 16 wherein said light absorbent means includes a layer of light absorbent material adhered to both of said first and second surfaces.

19. The scintillation camera of claim 16 wherein said light absorbent material comprises a coating deposited on said at least one surface.

* * * * *